United States Patent [19]
Valentine et al.

[11] Patent Number: 5,884,170
[45] Date of Patent: Mar. 16, 1999

[54] SUBSCRIBER FEATURE CONTROLLED HIGH PENETRATION MESSAGING

[75] Inventors: Eric L. Valentine; Erkki Joensuu, both of Plano, Tex.; Michael Coyne, Stockholm, Sweden; Ari Peltonen, Aachen, Germany

[73] Assignee: Ericsson, Inc., Research Triangle Park, N.C.

[21] Appl. No.: 719,282

[22] Filed: Sep. 24, 1996

[51] Int. Cl.$^6$ ............................... H04B 7/19; H04Q 7/38
[52] U.S. Cl. .................. 455/433; 455/12.1; 455/31.3; 455/466
[58] Field of Search .................... 455/12.1, 13.1, 455/13.4, 426, 427, 430, 433, 445, 458, 466, 522, 31.3

[56] References Cited

U.S. PATENT DOCUMENTS

| | | | |
|---|---|---|---|
| 5,008,952 | 4/1991 | Davis et al. | 455/12.1 |
| 5,047,763 | 9/1991 | Kuznicki et al. | 340/825.44 |
| 5,129,095 | 7/1992 | Davis et al. | 455/12.1 |
| 5,315,635 | 5/1994 | Kane et al. | 379/57 |
| 5,363,426 | 11/1994 | Nyhart | 379/57 |
| 5,369,681 | 11/1994 | Boudreau et al. | 379/87 |
| 5,392,451 | 2/1995 | Schwendeman et al. | 455/13.1 |
| 5,396,537 | 3/1995 | Schwendeman | 379/57 |
| 5,404,569 | 4/1995 | Schwendeman et al. | 455/13.4 |
| 5,465,399 | 11/1995 | Oberholtzer et al. | 455/69 |
| 5,594,776 | 1/1997 | Dent | 455/458 |

FOREIGN PATENT DOCUMENTS

| | | |
|---|---|---|
| 0 551 126 A1 | 7/1993 | European Pat. Off. . |
| 0 720 397 A2 | 7/1996 | European Pat. Off. . |
| 2 253 972 | 9/1992 | United Kingdom . |
| 91/09473 | 6/1991 | WIPO . |
| 96/08941 | 3/1996 | WIPO . |
| 96/10895 | 4/1996 | WIPO . |

*Primary Examiner*—Willis R. Wolfe
*Assistant Examiner*—Hieu T. Vo
*Attorney, Agent, or Firm*—Jenkens & Gilchrist, P.C.

[57] ABSTRACT

A mobile station communication network includes a high penetration network which schedules high transmission power level paging to reach a mobile station for which an acknowledgment signal is not received. A home location register stores mobile station high penetration network (HPN) subscriber feature information. The HPN analyzes mobile station class to determine an appropriate response when a mobile station fails to acknowledge a page request. The HPN further maintains a record of short message service (SMS) time out (timer) values and examines the ID of the center that generated the message to determine when the SMS center will time out. Just prior to the time out, the HPN will send a "user unavailable" signal to the originating SMS center to avoid unnecessary paging request retries by the SMS center.

14 Claims, 5 Drawing Sheets

SUBSCRIBER FEATURE CONTROLLED HIGH PENETRATION MESSAGING

BACKGROUND OF THE INVENTION

1. Technical Field of the Invention

The present invention relates to mobile cellular telephone communications systems and, in particular, to overcoming signal path interference during the delivery of messages to mobile stations by increasing the power of the communications transmissions.

2. Description of Related Art

Historically, paging systems and mobile telephone systems have provided service to a limited geographic area using a relatively high-powered centralized transmitting site. This arrangement has worked well in small cities and municipalities, but has often proved unsuitable for large metropolitan areas. To adequately serve a large geographic area, cellular phone systems began to simulcast (transmit the same signals at substantially the same time) from several transmitters strategically positioned to provide wide-area coverage. In such systems, a pager or a mobile station could receive information anywhere in the specified wide area.

Today, the trend in wireless communications is to provide even greater geographic coverage. Nationwide communication systems are often contemplated in an attempt to provide communication services to customers without regard to where they are in the United States, or for that matter, in the world. One known communication system employs satellites to transmit paging messages to pagers as well as cellular mobile stations.

It is well known that, in ground based cellular communication systems or satellite based communication systems, signal path interference can block a signal and prevent it from reaching the specified receiver. Such signal path interference of this type is often due to structural blockage from thick foliage, buildings and the like. Generally speaking, the signal path interference results in a mobile station being in an operational mode but also being temporarily unable to communicate with a transceiver.

Many methods and systems have been proposed for ground based as well as satellite based communication systems in response to the problem of mobile station unavailability for message delivery due to signal path interference. One proposed system includes a store in a mobile switching center for storing a message until the presence of the mobile station is detected through a registration, at which point the message is delivered or made available for retrieval. A drawback to this approach, however, is that the delivery of important messages may be unacceptably delayed until the mobile station clears the signal interference and re-registers within a cell area. Another drawback is that no further attempts to communicate with the mobile station and to deliver the potentially important message are made by the mobile switching center transceiver until re-registration occurs.

Another proposed solution to the problem of mobile station unavailability owing to signal path interference is to increase the transmission power level within a "standard" range of power levels. Increasing the power level within a standard range, however, may not be sufficient to overcome the signal interference due to structural path blockage. Moreover, current proposals for increasing transmission power include increasing power either on a system wide basis or on a cell wide basis. Under these proposals, unnecessary power levels are utilized for transmission to mobile stations which are receiving signals clearly in order to reach those mobile stations that are not receiving signals clearly.

In proposed satellite based communications systems, a mobile station located toward the center of a building or under a large oak tree with thick foliage may be subject to signal path interference and may not be able to receive and respond to a message delivery attempt or to a paging attempt from a satellite based transceiver. With satellites, the solution of transmitting at increased power levels is not always possible because many satellites have fixed transmission power level capabilities. While some satellites can exceed the standard transmission power levels to attempt to deliver a message, or to page a mobile station, other satellites have no capability of transmitting at increased power levels. Thus, a given satellite serving the mobile station may not be capable of performing a high power level transmission to overcome signal path interference.

Even for those scenarios in which it is possible to exceed standard transmission power levels, economic disincentives exist for doing so. It is likely that only some users will be interested in selectively using a higher power transmission level service. Other users simply may not care about becoming more "reachable". It would be unfair for the expenses of increased power transmission levels to be borne by all mobile station users. Thus, even if a satellite based transceiver has the capability to transmit a message at an increased power level, the increased power level should not be provided to those users that would not ordinarily need or appreciate such a service feature. There is a need, therefore, for a system to only transmit at increased transmission power levels in select situations.

Timing problems also exist with using satellite based transceivers for increased power transmissions to a ground based receiver. First, in order to avoid unnecessary transmissions at high power levels, increased power level transmissions should only be made after a transmission at a standard power level fails. Second, in a typical communication system, namely one in which high penetration power level transmissions do not occur, a paging system may designate that a user is unavailable after a mobile station fails to respond to at least one page attempt. Under current systems, certain time out values are established which only account for the amount of time required to page a mobile station at a standard power level. Current systems are set up wherein an originating source of a message rebroadcasts its message to initiate paging once a time out value is reached.

Unfortunately, such timeout values are frequently less than the time required for the communication system to initiate and process a second paging attempt or a third paging attempt at higher power levels. Accordingly, there is a need to reduce or eliminate unnecessary subsequent broadcast attempts or paging attempts by the originating source until it can be determined that a receiver is not responding even to the high power paging or communication attempts.

Another problem that exists, in those systems which utilize high power transmissions for paging or message delivery, is that a user has no way of knowing that a system is having to use non-standard transmission power levels to reach the user due to signal path interference. Accordingly, there is a need to provide such information to a user so that a user will know to move to a location less subject to signal path interference.

SUMMARY OF THE INVENTION

A communication system includes a high penetration network for making increased power level transmissions in connection with message deliveries to mobile stations. A high penetration node (HPN) is included either within a mobile switching center visitor location register (MSC/VLR) or located exterior to the MSC/VLR and coupled to it. The HPN includes a satellite information store for storing information relating to the capabilities of specific satellites including the orbital coordinates and orbit path information. The HPN operates to schedule the transmission of high power level paging and message delivery attempts according to retrieved satellite capability, location, and availability information.

The HPN further includes a store for maintaining time out timer values relating to the rebroadcast timer of known message originators. Such rebroadcasts of a message through the communication network typically occur upon failure to receive a response from an MSC/VLR specifying message delivery within a specified time out period. The HPN indicates to the message originator that a user is unavailable, which indication is made at a time just prior to the specified time out. The store for maintaining timer time out values may also be formed external to the HPN in a database accessible to the HPN in a different embodiment of the invention.

The HPN also includes a store for maintaining high penetration mode subscriber features specifying the nature of the high transmission power level transmissions to be made.

In another embodiment of the invention, the communications with a mobile station are performed through a conventional ground based communications system. In this embodiment, the HPN does not utilize the satellite information store. Rather, a similar store is used for storing information relating to the capabilities of ground based communication systems for communicating with mobile stations. If a particular base station system (BSS) serving the cell area in which a specified mobile station last registered its presence, the HPN will cause the BSS to page or to deliver an SMS message at a high power level.

The invention further includes a mobile station which not only has the capability of responding to a high penetration mode transmission from a transceiver at an increased transmission power level, but further includes visual and oral feedback to the mobile station user to inform the mobile station user that the communication system is having to overcome temporary signal path interference to establish communications. In practical terms, this informs the user of a need to move to a location less subject to the signal path interference. By way of example, a specified tone may be generated, a special symbol, string of digits or word may be displayed on a mobile station display or a specified light may be illuminated to provide such an indication to the mobile station user.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
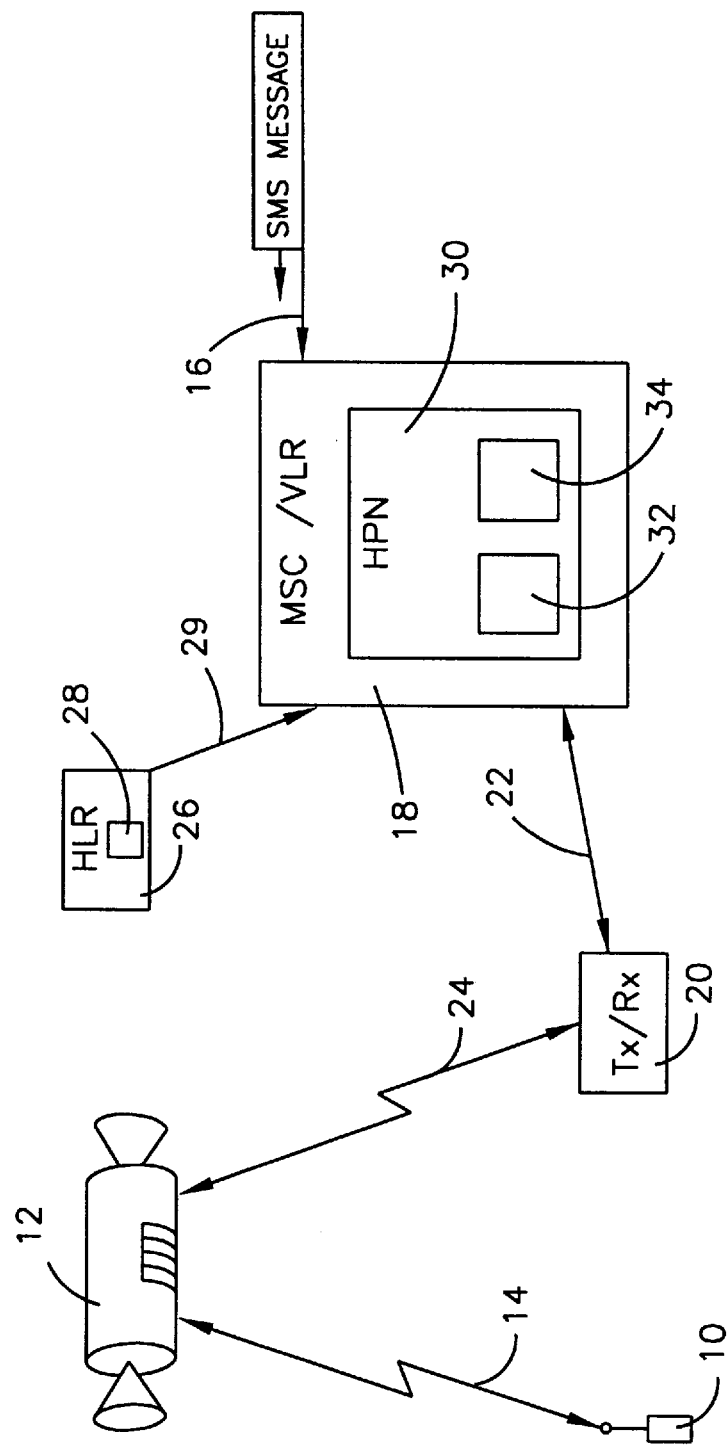
FIG. 1 is a simplified block diagram of a cellular communications network which includes a high penetration network.

The communication network of FIG. 1 includes a mobile station 10 which communicates with a transceiver, here a satellite 12, over radio frequency communications link 14. Satellite 12, in this embodiment, is capable of performing high transmission power level pages to establish traffic links and for delivering short messages to and from short message service center and to mobile stations similar to mobile station 10 and to other types of communication systems.

In general, satellite 12 is operable to transmit pages to a plurality of mobile stations 10 for the purpose of delivering a message such as an SMS message or a control message, to a specified mobile station having a unique ID, or for establishing a traffic channel to connect a call to the specified mobile station. In either case, satellites 12 generally wait for a response prior to attempting to deliver a message or establish a traffic channel. Typically, satellite 12 transmits to mobile station 10 an SMS message or other type of signal, such as a paging attempt reflecting a desire for a communication with mobile station 10 to be established. Satellite 12 receives signals from transceiver 20 which were originated by MSC/VLR 18 indicating that a message was received from an external source over line 16 for delivery to mobile station 10 or that an incoming call is being received for connection with mobile station 10 is received by MSC/VLR 18.

The communication network of FIG. 1 further includes a home location register (HLR) 26. HLR 26 includes a high penetration mode subscriber feature store 28 for storing parameters defining the high penetration mode features to which each mobile station 10 subscribes. These subscriber features include whether mobile station 10 is a subscriber to high penetration mode increased transmission power level transmissions, which of the specified high transmission power levels a subscriber is to receive, the number of high transmission power level retries from the same or other satellites, escalation of high penetration power level, whether the high transmission power level feature is currently activated, and whether the subscriber has any geographic restrictions namely, geographic regions in which the high transmission power level transmissions should not be utilized. HLR 26 is coupled for communication to MSC/VLR 18 by line 29.

MSC/VLR 18 includes an HPN 30. It is understood, of course, that HPN 30 could alternatively be located external to MSC/VLR 18 and be coupled thereto by a line (not shown). HPN 30 includes a satellite information store 32 and an SMS timer values store 34. Satellite information store 32 stores specified satellite information relating to high penetration mode capabilities of the satellites, by way of example, satellite 12, in orbit which form a part of the communication network. Satellite information store 32 also stores information pertaining to the stellar coordinates of each of the satellites 12 in orbit forming a part of a communication network as well as the specified location schedules for each satellite 12 as the satellites 12 orbit around the Earth. HPN 30 uses the information contained in the satellite information store 32 for scheduling satellite 12 high penetration mode high transmission power level transmissions.

The SMS timer value store 34 stores information identifying the SMS center (not shown) that originated the SMS message received on line 16 will time out and rebroadcast the SMS message deliver request through the communication network.

When an SMS message 15 is received on line 16, the message 15 includes parameters specifying the identity of the SMS center which originated the message 15. Upon receiving that message 15 on line 16, MSC/VLR 18 processes an included message delivery request and transmits the message delivery request to transmitter/receiver 20 over line 22. Transmitter/receiver 20 then transmits a signal to satellite 12 over communication link 24. Satellite 12, in turn, pages mobile station 10 to attempt to establish communication link 14. If mobile station 10 responds to the page request with an acknowledgment which is received by satellite 12, satellite 12 transmits a signal over communication link 24 to transmitter/receiver 20 reflecting that a communication with mobile station 10 was successfully established. Transmitter/receiver 20, in turn, transmits a signal to MSC/VLR 18 over line 22 reflecting that a communication link 14 was established with mobile station 10.

Alternatively, if an incoming call is received by MSC/VLR 18 on line 16, the system will operate in a similar manner to the SMS message delivery described above. One purpose of the page attempt by satellite 12, however, will be to trigger a response by mobile station 10 so that a traffic channel may be established over communication lines 14 and 24. A second purpose of the page attempt is to deliver the identity of the calling party to mobile station 10 for notification purposes and for later use.

If MSC/VLR 18 does not receive a signal on line 22 from transmitter/receiver 20 indicating that satellite 12 received an acknowledgment from mobile station 10, MSC/VLR 18 will analyze the high penetration mode subscriber feature data stored in high penetration mode subscriber feature data store 28 relating to mobile station 10 to determine if mobile station 10 is a subscriber to high penetration mode transmissions. If mobile station 10 is a subscriber to high penetration mode transmissions, then high penetration node 30 analyzes information stored in satellite information store 32 to determine if satellite 12 has high penetration mode capabilities. If satellite 12 does have high penetration mode capabilities, then HPN 30 will transmit a signal to transmitter/receiver 20 over line 22 for delivery to satellite 12 over communication link 24, which signal specifies that satellite 12 should perform a high penetration mode transmission. The signals transmitted over line 22 and over communication link 24 also include information specifying the high penetration mode transmission power level to be used to page mobile station 10 to establish a communication link 14.

HPN 30 then transmits high penetration mode transmission requests to transmitter/receiver 20 over line 22 and to satellite 12 from transmitter/receiver 20 over communication link 24. HPN 30 maintains a store reflecting a schedule of when high penetration mode transmissions are to occur and accordingly orders the high penetration mode transmissions at the specified times. In other embodiments, however, such information may be transmitted directly to satellite 12, wherein satellite 12 is allowed to initiate its own high power transmissions according to the information received from HPN 30.

If the information within satellite information store 32 indicates that satellite 12 does not have the capability for high penetration mode transmissions, then HPN 30 analyzes the information in satellite information store 32 to determine when the next high penetration mode capable satellite 12 will be able to service the coverage area in which mobile station was last known to be present and schedules high penetration mode transmissions accordingly.

The SMS timer value store 34 includes the time out values for known SMS centers (not shown). In conventional systems, an MSC/VLR 18 responds to an SMS center within a specified amount of time with a response which indicates whether mobile station 10 received the message. As a default, however, each SMS center includes a time out value after which expires it assumes that an error in the transmission of its network wide request to deliver an SMS message failed to reach the coverage area serviced by a particular MSC/VLR. At time out, the SMS center rebroadcasts its message delivery request through the communication network. The time out values for message originators may not accommodate a number of retries at a high transmission power level in accordance with the present invention. HPN 30 accordingly examines the SMS timer values in SMS timer value store 34 and sends to the originating SMS center a "user unavailable" message in order to prevent an unnecessary retry, as described above, by the SMS center. At a time in which a communication link 14 is established between mobile station 10 and satellite 12, then the system will operate in a manner as known to those skilled in the art to deliver the message to mobile station 10.

Figure 2:
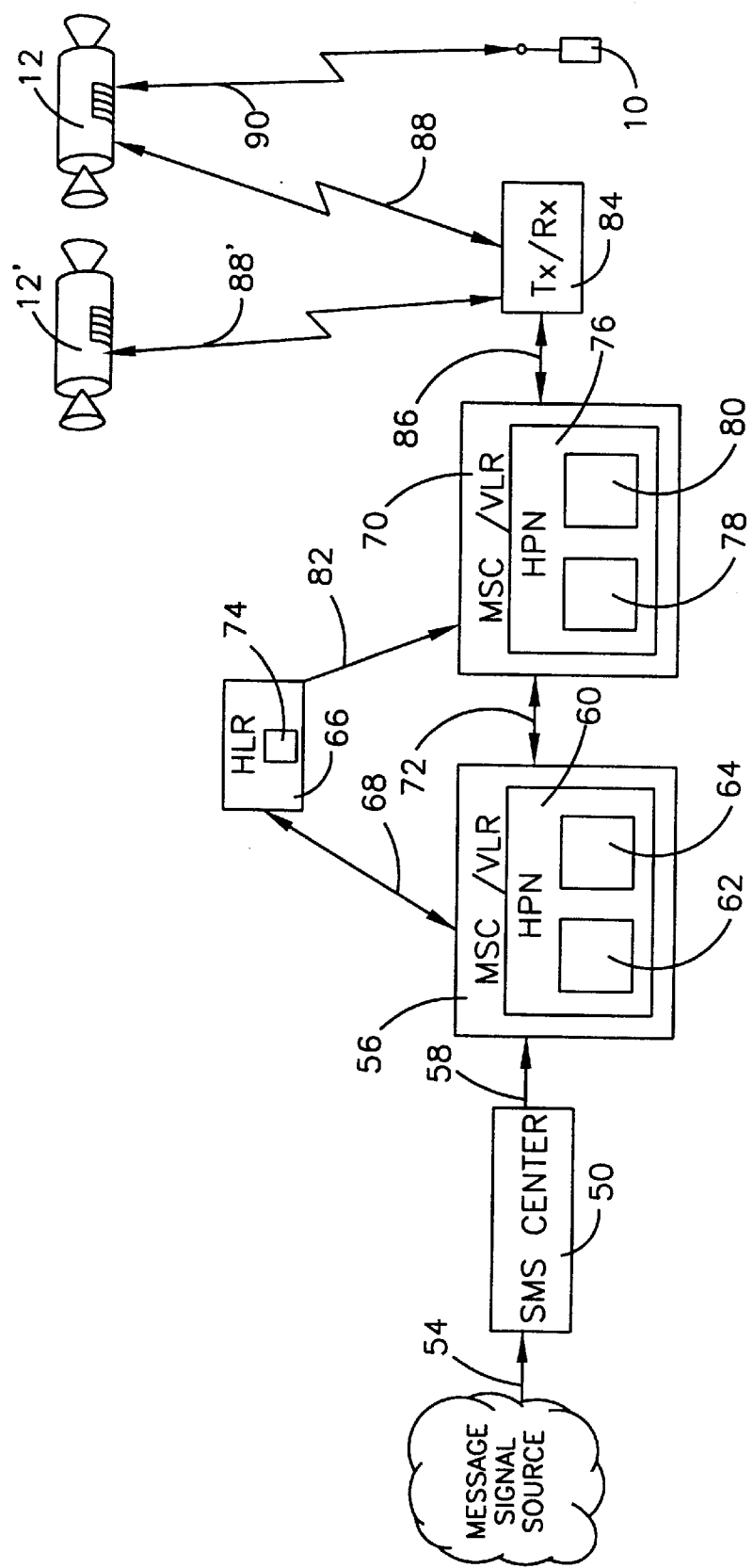
FIG. 2 is a schematic diagram of a cellular communications network within which the high penetration network operates.

Reference is now made to FIG. 2 wherein there is shown a functional block diagram of a cellular communication network within which the mobile station 10 operates. It is understood that the communication network services a substantial number of mobile stations 10, only one of which is shown in FIG. 2 for the sake of clarity.

The communication network of FIG. 2 provides cellular communication services to a plurality of service areas (not shown). It is understood that in many instances multiple service areas will be needed to cover a certain geographic area. Moreover, for a satellite based transceiver, the geographic arrangement of a cellular service area may differ substantially from service areas for a standard public land mobile network. As is known, each service area includes a plurality of cells, wherein each cell includes a transceiver. In this example, satellite 12 is the transceiver for effectuating radio frequency communications with proximately located mobile stations 10.

The communication network includes a short message service (SMS) center 50 coupled to receive signals from a message signal source 52 on line 54. The signals received on line 54 include an informational component reflecting a message to be delivered to a mobile station 10. Message signal source 52 represents any type of message generating system including any or a combination of keyboard entry, integrated services digital network (ISDN), Internet, public switch telephone network (PSTN), and other systems capable of transmitting messages. SMS center 52 is coupled to MSC/VLR 56 by line 58. MSC/VLR 56 includes an HPN 60 comprising a satellite information store 62 and an SMS timer value store 64. MSC/VLR 56 is also coupled to a home location register (HLR) 66 by line 68 and to another MSC/VLR 70 by line 72. HLR 66 includes a mobile station high penetration mode subscriber store 74. MSC/VLR 70 also includes an HPN 76, the HPN 76 comprising a satellite information store 78 and an SMS timer value store 80. MSC/VLR 70 is also coupled to HLR 66 by line 82 and to transmitter/receiver 84 by line 86. Transmitter/receiver 84 is coupled to satellite 12 by communication link 88 while satellite 12 is coupled to mobile station 10 by communication link 90.

An understanding of the operation of the communication network of FIG. 2 may best be explained by the use of several examples. In the first example, the mobile station 10 is located within a service area of satellite 12. After SMS center 50 receives a message from message signal source 52 on line 54 for delivery to mobile station 10, SMS center 50 transmits the formatted message to MSC/VLR 56. The message is routed through the network to the MSC/VLR 70 where the subscriber is registered. Thereafter, MSC/VLR 70 checks its visitor location register to confirm mobile station 10 registration as well as subscriber information and sends a page to the transmitter/receiver 84 over line 86. As is known to those skilled in the art, MSC/VLR 70 downloads information relating to mobile station 10 from an HLR. This downloaded information includes the subscriber feature data.

Upon receiving the page request from MSC/VLR 70, transmitter/receiver 84 transmits to satellite 12 a signal reflecting a request that satellite 12 page mobile station 10. Upon acknowledgment, MSC/VLR 70 may then transmit the message originated by SMS center 50 over links 88, 90. In this example, mobile station 10 acknowledges the page request via communication link 90. The message is then transmitted from MSC/VLR 70 to transmitter/receiver 84 and then is transmitted from transmitter/receiver 84 to satellite 12 over communication link 88 and then transmitted from satellite 12 to mobile station 10 over communication link 90.

In another example, mobile station 10 is within the service area of satellite 12, identical to the previous example, but satellite 12 fails to receive an acknowledge from mobile station 10 to the page request. After satellite 12 fails to receive an acknowledge signal from mobile station 10, as indicated by satellite 12 in a specified signal over communication line 88, HPN 76 receives and analyzes data which it receives from MSC/VLR and which had been previously downloaded from HLR 66 to MSC/VLR 70. This downloaded data includes the mobile station subscriber features of mobile station 10. This previously downloaded data is downloaded as a point of typical operational protocol as is known to those skilled in the art. Typically, such data is downloaded from the HLR to the MSC/VLR at registration. HPN 76 then analyzes the specific high penetration subscriber mode features subscribed by mobile station 10 as found within the downloaded data in order to schedule a high penetration mode transmission from satellite 12 to mobile station 10 if mobile station 10 has subscriber features which include high penetration mode transmissions.

High penetration mode 76 also analyzes the information within satellite information store 78 to determine if satellite 12 is capable of performing high penetration mode transmissions. In this example, satellite 12 is capable of performing such transmissions. Accordingly, HPN 76 transmits the signal to transmitter/receiver 84 over line 86 to relay a signal to satellite 12 over communication link 88 that satellite 12 is to perform a specified high penetration mode transmission to mobile station 10. In this embodiment, HPN 76 maintains control of the timing of the high penetration mode transmissions and only transmits a signal over line 86 and ultimately to satellite 12 over communication link 88 to effect a high penetration mode transmission to transmitter/receiver 84. Therefore, it is HPN 76 that analyzes the subscriber features of mobile station 10 as stored in high penetration mode subscriber feature store 74 of HLR 76 to determine when, whether, and how frequently to issue the high penetration mode transmissions.

In yet another example, the current satellite 12 serving the geographic area in which mobile station 10 has last registered its presence is not capable of performing high penetration mode transmissions. HPN 76, before issuing a high penetration mode transmission control signal to transmitter/receiver 84 and therefore to satellite 12, examines the contents of satellite information store 80 to determine that satellite 12 does not have high penetration mode transmission capabilities. Accordingly, rather than send out a high penetration mode transmission request over line 86, HPN 76 examines the contents of satellite information store 80 to determine when the next satellite 12' with high penetration mode transmission capabilities will be able to service the geographic area in which mobile station 10 has last registered its presence. HPN 76 then schedules a high penetration mode transmission according to such analysis. In this example, once such satellite 12' with high penetration mode transmission capabilities is able to transmit page requests at a high penetration mode, HPN 76 sends a signal to transmitter/receiver 84 over line 86 which in turn transmits the signal to satellite 12' over communication link 88' to perform the high penetration mode transmission. It is understood, of course, that HPN 76 will cancel the scheduled high penetration mode transmission if mobile station 10 has re-registered its presence prior to the scheduled high penetration mode transmission. As discussed above, the HPN paging transmissions occur in response to a failure to receive an acknowledgment signal if the subscriber feature for the mobile station includes HPN mode transmissions. By way of example, instead of having a subscriber feature based HPN paging service, a system could utilize a class based or a geography based system. For example, all international mobile subscriber identity numbers (IMSI) having a specified mobile country code (MCC) indicating the mobile station is from a foreign country could be designated for HPN transmissions. Alternatively, all mobile stations within a certain geographic area, which geographic area is to introduce extraordinary amounts of signal path interference, could be designated for HPN transmissions. Referring again to FIG. 2, store 74 could be replaced by a store 75 for storing a list of those mobile stations which are to receive HPN transmissions according to IMSI code (according either to class or geographic location).

Figure 3:
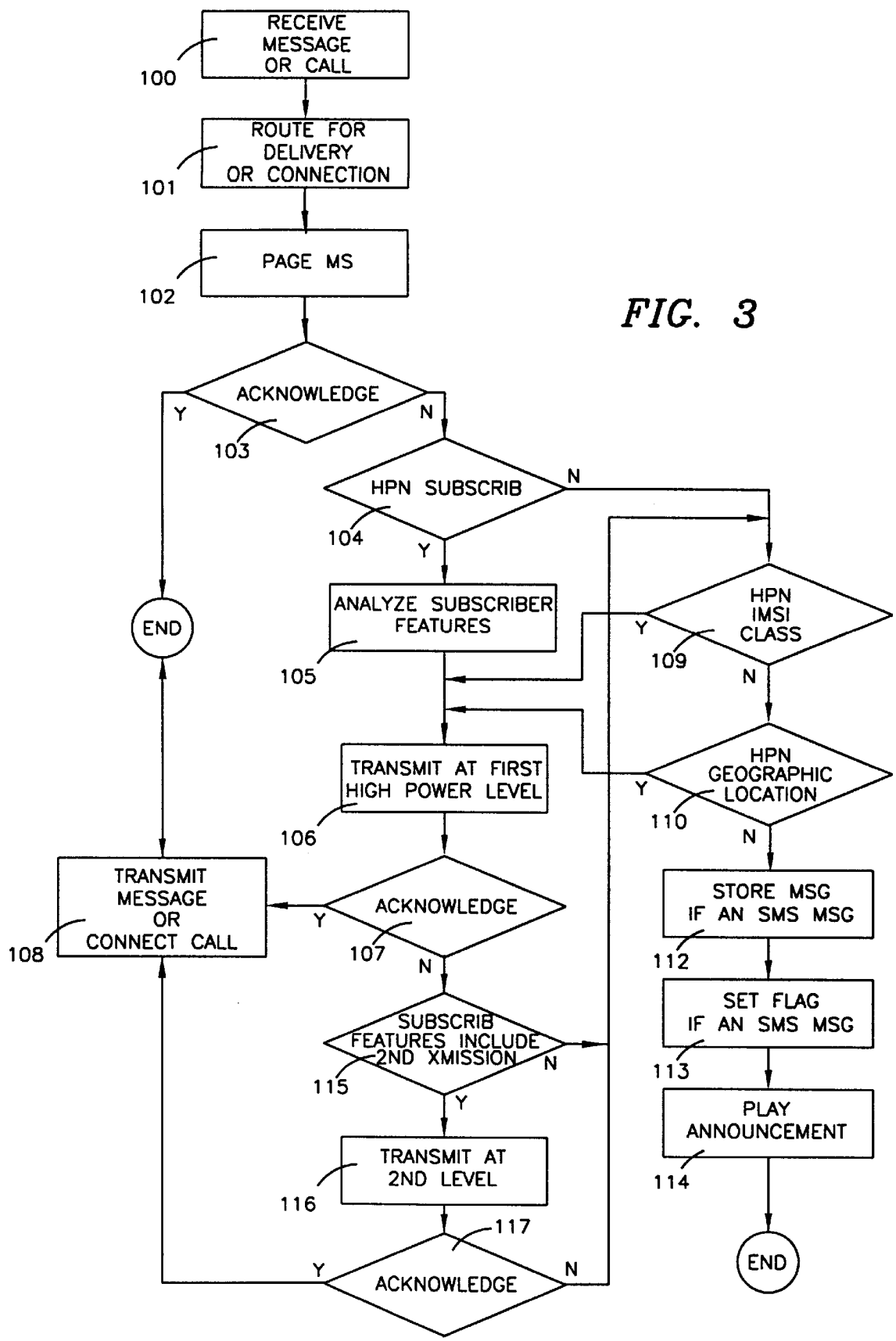
FIG. 3 is a flow diagram generally illustrating the operation of the cellular communications network to deliver messages to the mobile station of the present invention.

Reference is now made to FIG. 3 wherein there is shown a flow diagram illustrating operation of the present invention. When a short message service (SMS) message from a short message service center or a call is received (step 100), the message or call is routed through the network for delivery or connection to the proper mobile station (step 101). After paging the mobile station (step 102), the system determines whether the page is acknowledged by the mobile station (step 103). If the intended recipient mobile station fails to acknowledge a page request transmitted by satellite (decision step 103), the system determines whether the mobile station is a high penetration mode subscriber (step 104). If the mobile station is a high penetration mode subscriber, the system then analyzes the mobile station subscriber features (step 105). The system then retransmits the page at a first increased transmission power level (step 106).

If the mobile station is not a high penetration mode subscriber, the system examines the mobile stations' International Mobile Subscriber Identify (IMSI) number to determine if the mobile station belongs to a class which is to receive high penetration mode transmissions (step 109). If yes, the system retransmits the page at a first high power level (step 106). If the mobile station does not belong to such a class, the system determines if the mobile station is within a geographic area to which high penetration mode transmissions are to be made (step 110). If so, the page request is retransmit at a first high power level (step 106). If not, the message is stored, if it is a message that is to be delivered and a message flag is set (steps 112 and 113). If it is a phone call that is being connected, an announcement is played indicating the "user is unavailable".

After the page at the first increased transmission power level, the system determines whether an acknowledge signal was received from the recipient mobile station (decision step 107). If an acknowledge signal was received, the target message, by way of example, an SMS message, is transmitted (step 108).

If the system determines that the intended recipient is not a high penetration mode subscriber (decision step 104), the system stores the message (step 112) and sets a message flag reflecting that a message exists for delivery to the mobile station (step 113). The operation of storing the message and setting a flag (steps 112 and 113) are a part of ordinary SMS operations.

If the communication network does not receive an acknowledge from the mobile station after the first high transmission power level page (step 107), the communication network then determines whether the subscriber features for the mobile station authorize a second or multiple transmissions at the same or a second high penetration mode power level (step 115). If not, then the message is stored and the flag is set (steps 112 and 113) if the system is responding to an SMS message. If the system is responding to an incoming call, an announcement is played to indicate "the user is unavailable" (step 114). If the subscriber features do include a second transmission at a second transmission power level, then a transmission is initiated to transmit a page request at the second transmission power level (step 116). If an acknowledge signal is received from the mobile station, then the message is transmitted (step 108). However, if the second transmission at a high penetration mode second power level is not acknowledged, then the message is stored (step 112) and the message flag is set (step 113).

Additionally, in one embodiment, the steps of transmitting at a first power level (step 106) and at a second power level (step 116) include the step of transmitting identifying information, such as message number or calling party number, in the page transmission. This way, the mobile station may receive such information even if it can not respond at a power level detectable by the satellite. At or after the time that these page requests are being made, a voice message is played to the calling party, in the case of an attempted phone call, to inform the calling party that the called party is unavailable (as is currently implemented in public land mobile networks).

Figure 4:
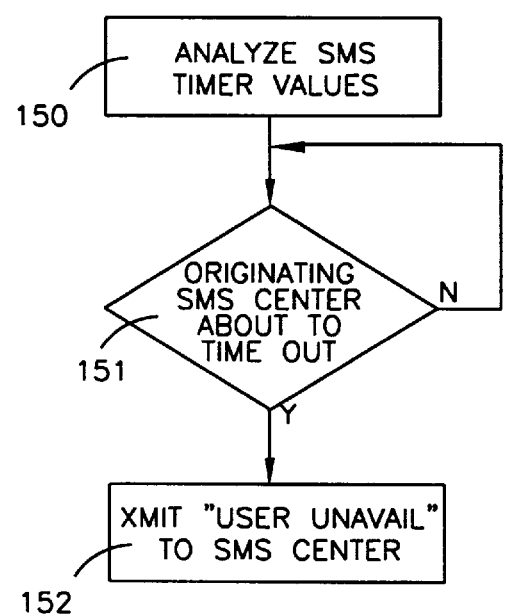
FIG. 4 is a flow diagram illustrating operation of the present invention to avoid unnecessary paging attempts.

Referring now to FIG. 4, there is shown a method for preventing an SMS center from needlessly broadcasting paging requests. When a mobile station fails to acknowledge a page request, steps similar to those discussed in relation to the methods of FIG. 3 for performing high penetration mode transmission modes are followed. Concurrently, the system analyzes the values within an SMS timer store to determine the "time out value" of the SMS center which originated the message being delivered to the mobile station (step 150).

Ordinarily, an SMS center expects a response from an MSC/VLR indicating that the mobile station acknowledged the page request or that the mobile station is unavailable. In order to prevent the SMS center from waiting indefinitely for acknowledgment, however, SMS centers usually are assigned a value of time which, when expired without receiving a response whatsoever, causes the SMS center to rebroadcast its page request. It is assumed that the lack of response is due to some type of system error. Unfortunately, however, the time out values for at least some SMS centers are not long enough to permit the number of retries in the high penetration mode as specified in the subscriber feature for the mobile station. Accordingly, the system monitors the time and compares that time to determine if the originating SMS center is about to time out (step 151). Generally, an SMS center is "about to time out" when a specified amount of time before the expiration of the time out value is reached. Typically, this specified amount of time is a time value that is at least slightly greater than that required for a response to be transmitted to and received by the originating SMS center.

Once the originating SMS center is about to time out, then a "user unavailable" signal is transmitted to the SMS center. The purpose of transmitting this "user unavailable" signal is to cause the SMS center to store its message, set a message waiting flag for the mobile station which was to have received the message and to preclude repeated transmission of system-wide page requests.

Figure 5:
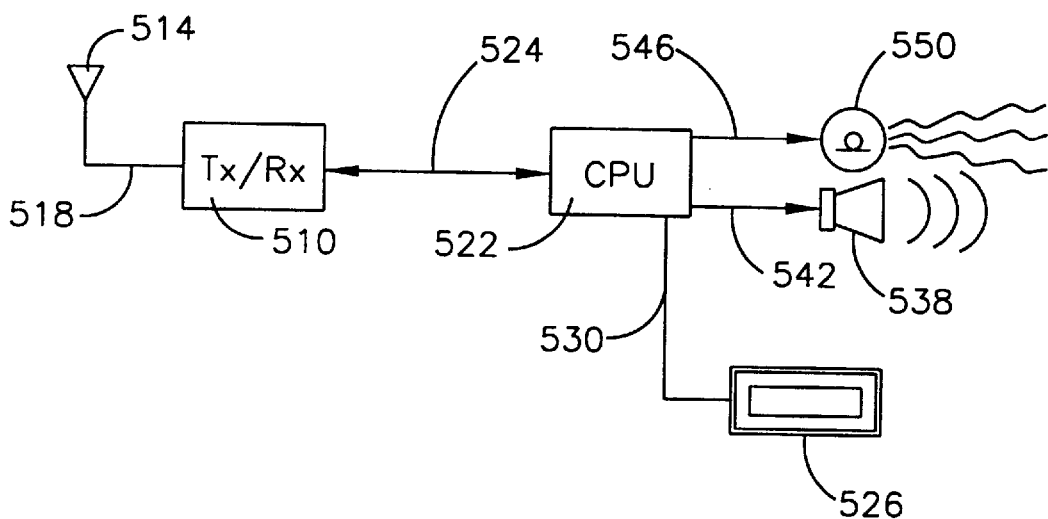
FIG. 5 is a block diagram of a mobile station including aural and visual sources for informing a user of signal path interference induced high penetration mode transmission.

Referring now to FIG. 5, there is shown a block diagram of a mobile station 10 which includes aural and visual sources to indicate to a user that a high penetration mode transmission was made to overcome signal path interferences. Whenever receiver/transmitter (Rx/Tx) 510 receives a signal from antenna 514 over line 518, which signal indicates that the signal was transmitted in a high penetration mode, Rx/Tx 510 sends a signal to processing unit (CPU) 522 over line 525 indicating that the received signal was received from a high penetration mode transmission. CPU 522, in turn, indicates the same to a user by transmitting a signal to display 526 over line 530. Accordingly, display 526 displays a message 534 indicating the same. CPU also sends a signal to speaker 538 over line 542 to cause a tone or sound to be generated indicating the same. Finally, CPU 522 also sets a voltage on line 546 to cause light source 550 to generate light to indicate the same to the user.

Although preferred embodiments of the method and apparatus of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. By way of example, the invention may be implemented in a land based system wherein only some base stations include high penetration mode transmission capability. In a land based embodiment, by way of example, an Intelligent Network (IN) system, control of system, as performed by the HPN, could reside in the service control node (SCN). In such a case, the HPN node would form a service resource function (SRF) for the IN. Accordingly, the invention may be practiced in public land mobile network (PLMN), public switched telephone network (PSTN), intelligent network (IN), advanced intelligent network (AIN), and global system for mobile communications (GSM) networks.

What is claimed is:

1. A communication system for communicating with a mobile station, the communication station comprising:
    a mobile switching center (MSC) for receiving a short message from a short message service (SMS) center and for receiving a call dialed to the mobile station, the MSC also for transmitting the short message and for routing the call to the mobile station; and a high penetration node (HPN) within the MSC and coupled by transmitter/receiver to a satellite transceiver having high transmission power level transmission capability, the HPN controlling high transmission power level paging attempts by the satellite transceiver to a mobile station, the HPN comprising:

a first store for maintaining satellite transceiver orbit information and high beam level transmission capability information for a plurality of satellite transceivers for use by the HPN in scheduling high transmission power paging requests by a satellite transceiver following a failure by the mobile station to acknowledge a lower transmission power paging request; and a second store for maintaining a bank of SMS center time out values, which HPN uses a time out value from the second store indicating when the SMS center will time out for determining when to transmit a signal prior to time out reflecting that the mobile station is unavailable.

2. A high penetration node (HPN) coupled to a mobile switching center, comprising:

a transmitter/receiver for communicating with at least one satellite transceiver having high transmission power level capability;

a satellite information store for storing satellite transceiver capability information and for storing satellite transceiver orbit information; and means for scheduling high transmission power level transmissions from the at least one satellite transceiver, the means coupled to said transmitter/receiver for sending high transmission power level control commands to the at least one satellite transceiver through said transmitter/receiver according to information stored in the satellite information store following a failure by a mobile station to acknowledge a lower transmission power paging request.

3. The HPN of claim 2 further comprising a time out store for maintaining time out values of short message service (SMS) centers, which HPN uses the time out values to determine the timing of high transmission power level signal transmissions.

4. A high penetration node (HPN) coupled to a mobile switching center to receive a message generated by a short message service center, the high penetration node comprising:

a transmitter/receiver having high transmission power level capability;

means for scheduling high transmission power level transmissions from the transmitter/receiver following a failure by a mobile station to acknowledge a lower transmission power paging request;

a timer store for storing at least one short message service (SMS) center time out value for the short message service center; and logic means coupled to said timer store, which logic means transmits a signal if a mobile station being paged does not acknowledge within the SMS center time out period, which signal reflects that a mobile station is unavailable, to the SMS center just prior to the expiration of the time out value since the transmission of the SMS message from the SMS center, the time out value being for the SMS center.

5. The HPN of claim 4 further comprising a satellite information store for storing satellite transceiver capability information and satellite orbit information wherein said HPN schedules high penetration beam paging requests according to satellite transceiver capability and orbit location.

6. A method, in a high penetration node, for paging a mobile station comprising the steps of:

receiving one of a message for delivery to a mobile station (MS) or a data packet for an incoming call to be connected to the MS;

receiving from a home location register (HLR) a signal reflecting high penetration subscriber features associated with the MS;

transmitting a first page request at a standard power level;

analyzing the high penetration subscriber features for the MS;

transmitting a second page request at a first high penetration beam power level if an acknowledge is not received after the first page and if the subscriber features indicate that a high penetration mode is enabled; and wherein the mobile station is specified for those mobile stations whose subscriber features include high penetration mode transmissions.

7. The method of claim 6 further comprising the step of transmitting a third page request at a second high penetration beam power level if an acknowledge is not received after the first high penetration beam power level page and if the subscriber features indicate that a second high penetration beam mode is enabled.

8. The method of claim 6 further comprising the steps of:

receiving, from an SMS center time out store, a signal reflecting a time out value for the SMS center; and transmitting a signal to the SMS center reflecting that the MS is unavailable, which signal is transmitted to the SMS center just prior to expiration of a time out value following a failure by the mobile station to acknowledge a paging request.

9. A method, in a communication system having high penetration mode transmission capabilities, of paging a mobile station, the method comprising the steps of:

receiving a signal to be communicated to a mobile station;

paging the mobile station at a low penetration power level;

paging the mobile station at a high penetration power level if the mobile station fails to respond to the low penetration power level page and is specified to receive high penetration power level paging service; and wherein the mobile station is specified for those mobile stations whose subscriber features include high penetration mode transmissions.

10. The method of claim 9 wherein the signal to be communicated is a short message service center message.

11. The method of claim 9 wherein the mobile statioin is specified for those mobile stations whose geographic location is a specified location suited to receive high penetration mode transmissions.

12. The method of claim 9 wherein the mobile station is specified for those mobile stations whose International Mobile Subscriber Identity (IMSI) codes indicate that the mobile station is to receive high penetration mode transmissions.

13. The method of claim 9 wherein the signal to be communicated is an incoming call to be connected to the mobile station.

14. The method of claim 9 which further includes the step of transmitting a calling party phone number in second or subsequent paging attempts.

* * * * *

UNITED STATES PATENT AND TRADEMARK OFFICE
CERTIFICATE OF CORRECTION

PATENT NO. : 5,884,170
DATED : Mar. 16, 1999
INVENTOR(S) : Valentine et al.

It is certified that error appears in the above-identified patent and that said Letters Patent is hereby corrected as shown below:

Column 12, line 52    Replace "statioin"
                      With --station--

Signed and Sealed this

Eighteenth Day of January, 2000

Attest:

Q. TODD DICKINSON

Attesting Officer    Commissioner of Patents and Trademarks